United States Patent [19]
Vainsencher

[11] Patent Number: 5,977,997
[45] Date of Patent: Nov. 2, 1999

[54] SINGLE CHIP COMPUTER HAVING INTEGRATED MPEG AND GRAPHICAL PROCESSORS

[75] Inventor: Leonardo Vainsencher, San Jose, Calif.

[73] Assignee: LSI Logic Corporation, Milpitas, Calif.

[21] Appl. No.: 08/812,773

[22] Filed: Mar. 6, 1997

[51] Int. Cl.[6] .................................................. G06F 15/76
[52] U.S. Cl. ........................... 345/519; 345/503; 345/521
[58] Field of Search .................................... 345/501–504, 345/519, 512, 521, 202, 302, 507–509

[56] References Cited

U.S. PATENT DOCUMENTS

| | | | |
|---|---|---|---|
| 5,293,586 | 3/1994 | Yamazaki et al. ...................... | 345/519 |
| 5,392,391 | 2/1995 | Caulk, Jr. et al. ...................... | 345/503 |
| 5,432,900 | 7/1995 | Rhodes et al. .......................... | 345/302 |
| 5,493,646 | 2/1996 | Guttag et al. ........................... | 345/519 |
| 5,664,218 | 9/1997 | Kim et al. ............................... | 345/302 |
| 5,732,224 | 3/1998 | Gulick et al. ........................... | 345/302 |

OTHER PUBLICATIONS

Electronic, "single chip computer scambles for security" by Budzinski, pp. 140–144, Jul. 19, 1979.

Compcon 92, 37 IEEE computer society international conference, "The LR33020 graphX processor: a single chip X terminal controller" by Tobias, pp. 358–363, Feb. 24, 1992.

Digital signal processing, 1994 workshop, "The multimedia video processor (MVP): a chip architecture for advanced DSP applications" by Gove, pp. 27–30, Oct. 1994.

IEEE Computer Graphics and applications, vol. 12, 155.6 "A single–chip Multiprocessor for Multimedia: The MVP" by Guttag et al. pp. 53–64, Dec. 1992.

*Primary Examiner*—Kee M. Tung
*Attorney, Agent, or Firm*—Beyer & Weaver, LLP

[57] ABSTRACT

A highly integrated, single chip computer system having not only a central-processing unit (CPU) but also specialized coprocessors. The specialized coprocessors, for example, enable the single chip computer system to be reasonably sized, yet perform high quality video (e.g., MPEG-2) and graphics operations (e.g., three-dimensional graphics). The single chip computer system offers improved performance of video and graphics operations, resource scheduling and security. The improved security offered by the single chip computer system enables program code or data stored external to the single chip computer system to be encrypted so as to hinder unauthorized access, while internal to the single chip computer system the program code or data is decrypted. The single chip computer system is particularly suitable for video game consoles having high quality graphics and/or video, digital video disk (DVD) players, and set-top boxes.

15 Claims, 4 Drawing Sheets

SINGLE CHIP COMPUTER HAVING INTEGRATED MPEG AND GRAPHICAL PROCESSORS

BACKGROUND OF THE INVENTION

1. Field of the Invention

The present invention relates to a computer system, and more particularly, to a single chip computer system having integrated MPEG and graphical processors.

2. Description of the Related Art

Microprocessors have been used for many years as a primary component of computer systems. Conventionally, a microprocessor is a single chip device that includes a central-processing unit (CPU), registers, I/O and interrupt managers, etc. High performance microprocessors also typically include a built-in coprocessor or a functional unit dedicated to performing floating-point computations.

Recently, graphics and video has become popularized and desirable to many computer users. Specialized graphics support is needed to obtain high quality graphics. Likewise, specialized video support is needed to display moving pictures read from compact-disks or downloaded from a remote server. The existing video compression standard that is often supported is MPEG.

In conventional designs of computer systems that are built to support normal processing as well as graphics and MPEG processing, the hardware or circuitry for all the needed processing is provided by two or more separate integrated circuits. Recently, LSI Logic Corporation of Milpitas, Calif. has produced an integrated circuit chip (Sony-PSx) for Sony Corporation that combined a JPEG like processor and a geometry transformation processor onto a microprocessor chip. However, additional supporting chips were still be required to perform MPEG, display control, and boot-up operations. Also, the interfacing of these supporting chips to the microprocessor chip was very costly in terms of the number of pins required on the microprocessor chip itself. For example, to interface the microprocessor to a MPEG coprocessor would likely require over one-hundred (100) connections (pins) between the microprocessor and the MPEG coprocessor. Having to provide such microprocessor to coprocessor interface is a substantial burden on microprocessor designers and impairs the ability of the microprocessor to support other operations.

Moreover, due to the complexity of the microprocessor and the various coprocessors needed, previously it has been physically impossible or too difficult to combine all the needed functionality into a single integrated circuit chip. As a result, since each of the processors requires significant memory capacity and bandwidth, dedicated memory had to be separately provided in the various chips. The dedicated memories were normally built to handle peak needs of the processor. For example, the memory needs of a microprocessor varies with application size, the memory needs of a graphics processor varies with the size and complexity of the images being rendered, and the memory needs of a MPEG processor varies with picture size. As a result, in conventionalmultimedia computer system designs memory usage was inefficiently utilized. Inefficient usage of memory is problematic because memory is a major cost component of producing such integrated circuits.

Existing microprocessor designs also offer no protection against unauthorized access to program code or data. With multi-chip implementations, an authorized user typically has access to the pins of the chips that interface to the microprocessor and can intercept program code and data therefrom.

Thus, there is a need for a single chip computer system that supports not only normal processing operations but also provides specialized support for graphical and video processing operations. There is also a need for a computer system that provides improved security for program code and data.

SUMMARY OF THE INVENTION

Broadly speaking, the invention relates to a highly integrated, single chip computer system having not only a central-processing unit (CPU) but also specialized coprocessors. The specialized coprocessors, for example, enable the single chip computer system to be reasonably sized, yet perform high quality video and graphics operations. As an example, the video support may be MPEG-2 and the graphics support may handle three-dimensional graphics. The single chip computer system offers improved performance of video and graphics operations, resource scheduling and security. The improved security offered by the single chip computer system enables program code or data stored external to the single chip computer system to be encrypted so as to hinder unauthorized access, while internal to the single chip computer system the program code or data is decrypted. The single chip computer system is particularly suitable for video game consoles having high quality graphics and/or video, digital video disk (DVD) players, and set-top boxes.

The invention may be implemented in numerous ways, including as a system, an apparatus and a method. Several implementations are discussed below.

As a single chip computer system, an embodiment of the invention includes: a read-only memory (ROM), the ROM storing at least boot-up code to boot-up the single chip computer system; a plurality of special-purpose coprocessors for performing special processing tasks; a central processing unit (CPU) for performing general purpose processing tasks, the general purpose processing tasks include executing of program code; at least one inter-processor bus for transmitting data and control signals between the CPU and the coprocessors or between the coprocessors; a memory interface for interfacing the single chip computer system to an external common shared memory; and a main CPU bus for transmitting data and control signals between the CPU and the memory interface. Preferably, the special purpose coprocessors include a graphics geometry coprocessor; a graphics rendering coprocessor; and an MPEG coprocessor.

An embodiment of the single chip computer system may further include: a display controller for controlling a display device to display graphical images and video images; a graphics bus operatively connecting the graphics rendering coprocessor and the memory interface; and a video bus operatively connecting the memory interface to the MPEG coprocessor and the display controller. Still further the single chip computer system may include a stream interface for receiving data from a peripheral drive; a stream bus for supplying the received data to at least one of the inter-processor bus and the main CPU bus; an audio digital-to-analog converter (DAC) interface for operatively connecting the MPEG coprocessor to external speakers; and a video DAC PAL/NTSC encoder for supplying image display information to an external display device in a suitable analog form.

As a single chip computer system that utilizes encrypted program code and data to prevent unauthorized copying of the encrypted program code and data, another embodiment of the invention includes: an internal read-only memory (ROM), the internal ROM storing at least boot-up code to boot-up the single chip computer system and storing a private encryption key; a central processing unit (CPU) for performing general purpose processing tasks, the general purpose processing tasks include executing of program code; a memory interface for interfacing the single chip computer system to an external common shared memory, the memory interface including an encryption/decryption apparatus for encrypting data to be stored to the external common shared memory and for decrypting data retrieved from the external common shared memory, the encryption and decryption being dependent on the private encryption key stored in the internal ROM; and a main CPU bus for transmitting data and control signals between the CPU and the memory interface.

An embodiment of the single chip computer system may further include a plurality of special-purpose coprocessors for performing special processing tasks; and at least one inter-processor bus for transmitting data and control signals between the CPU and the coprocessors or between the coprocessors. Also, the single chip computer system may include a stream interface for receiving encrypted data from a peripheral drive and a decryption apparatus for decrypting the encrypted data from the peripheral drive based on the private encryption key stored in the internal ROM.

As a method for securely booting-up a single chip computer system coupled to an external data storage device, an embodiment of the invention includes the operations of: providing the single chip computer system with an internal code read-only memory (ROM) storing at least boot-up program code and a private encryption key; beginning boot-up sequence for the single chip computer system by executing the boot-up program code from the internal code ROM; retrieving additional encrypted program code at the single chip computer system from the external data storage device; and decrypting the retrieved encrypted program within the single chip computer system using the private encryption key stored in the code ROM.

The advantages of the invention are numerous. One advantage of the invention is that the single chip computer system includes circuitry to perform high performance graphics and video operations. Another advantage of the invention is that the increased integration associated with the single chip computer system facilitates improved resource allocation and scheduling, faster memory access, and less pins or pads for the single chip computer system. Still another advantage is that the single chip computer system offers increased security for program code and data so as to deter unauthorized access thereto.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a computer system having not only a central-processing unit (CPU) but also specialized coprocessors integrated onto a single integrated circuit chip. The specialized coprocessors, for example, enable the single chip computer system to be reasonably sized, yet perform high quality video and graphics operations. As an example, the video support may be MPEG-2 and the graphics support may handle three-dimensional graphics. The single chip computer system offers improved performance of video and graphics operations, resource scheduling and security. The improved security offered by the single chip computer system enables program code or data stored external to the single chip computer system to be encrypted so as to hinder unauthorized access, while internal to the single chip computer system the program code or data is decrypted. The single chip computer system is particularly suitable for video game consoles having high quality graphics and/or video, digital video disk (DVD) players, and set-top boxes.

Embodiments of the invention are discussed below with reference to FIGS. 1–4. However, those skilled in the art will readily appreciate that the detailed description given herein with respect to these figures is for explanatory purposes as the invention extends beyond these limited embodiments.

Figure 1:
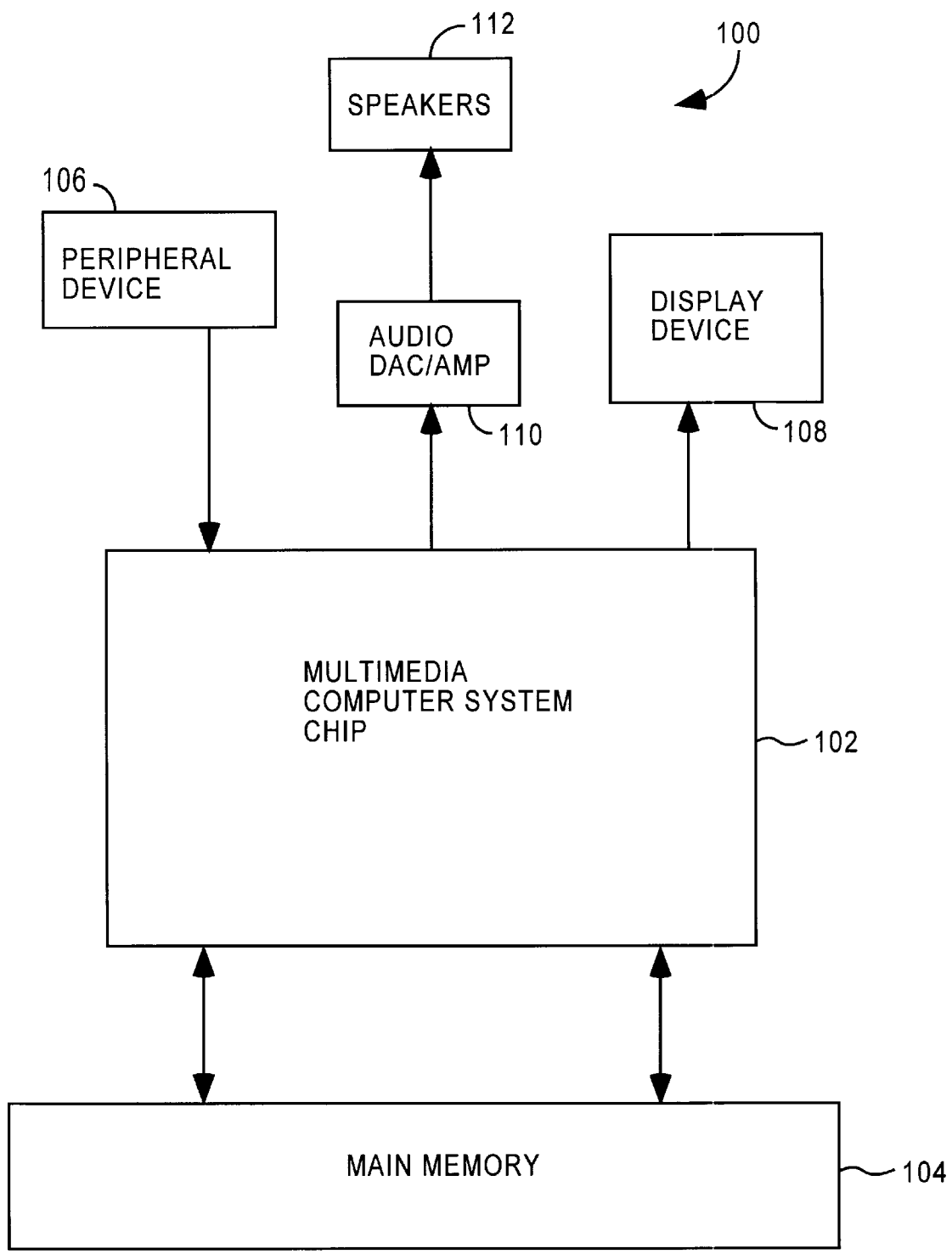
FIG. 1 is a block diagram of a computer system according to an embodiment of the invention.

FIG. 1 is a block diagram of a computer system 100 according to an embodiment of the invention. The computer system 100 includes a multimedia computer system chip 102. The multimedia computer system chip 102 is a highly integrated circuit chip that is able to efficiently support multimedia operations. The multimedia computer system chip 102 is also electrically connected to a main memory 104. The main memory 104 is semiconductor memory storage such as random-access memory (RAM), for example, SDRAM, DRAM, SGRAM, RAMBUS, etc. The multimedia computer system chip 102 is also coupled to a peripheral device 106. Examples of various peripheral devices 106 are a hard disk drive, a CD-ROM drive, a tape drive, digital video disk (DVD), etc. The graphical and video outputs from the multimedia computer system chip 102 are provided by a display device 108 that displays video and graphical images for a user. Additionally, an audio digital-to-analog converter/amplifier (DAC/AMP) 110 and speakers 112 together provide audio output sounds for the user.

Figure 2:
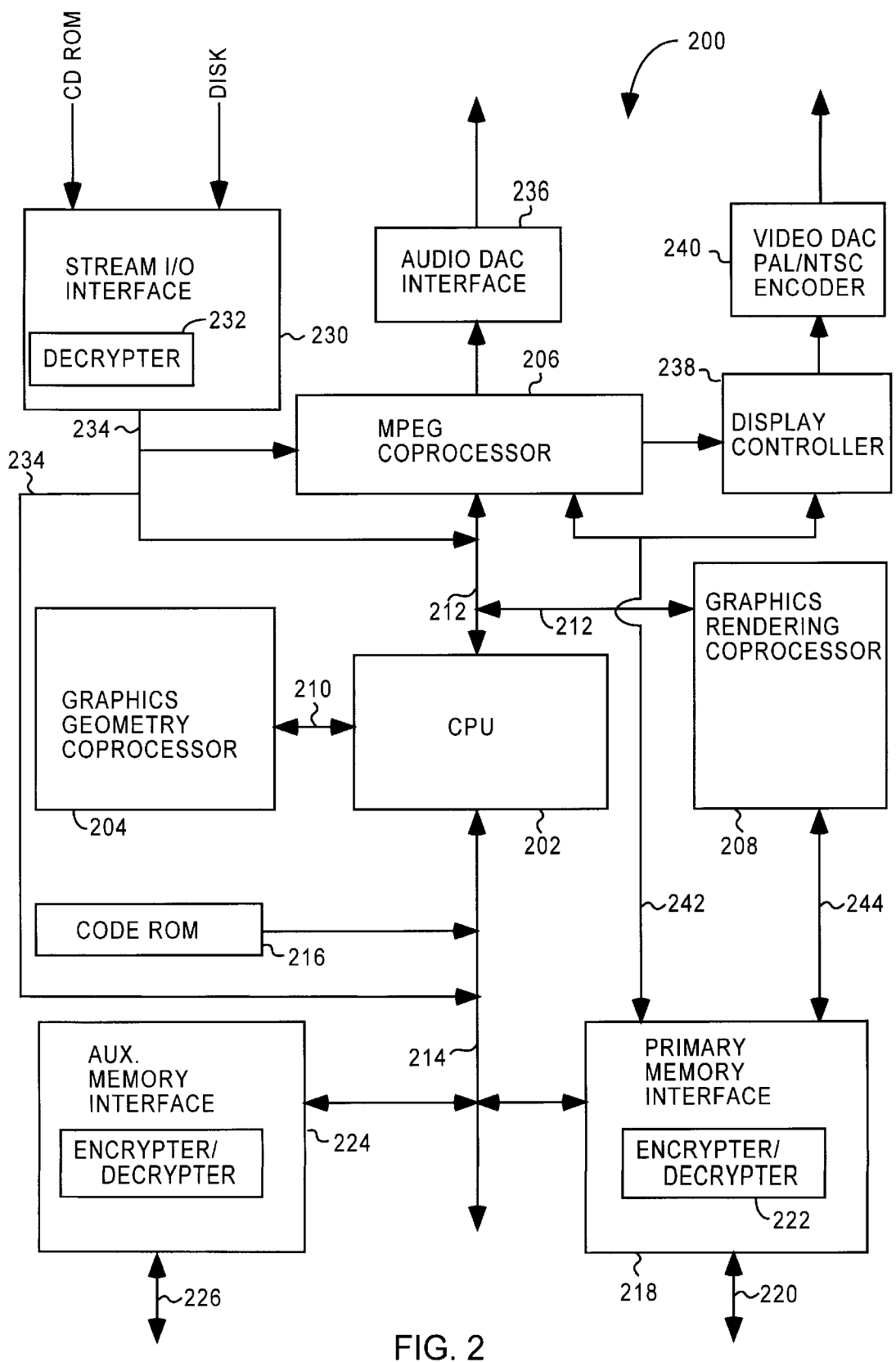
FIG. 2 is a detailed block diagram of a multimedia computer system chip according to a detailed embodiment of the invention.

FIG. 2 is a detailed block diagram of a multimedia computer system chip 200 according to a detailed embodiment of the invention. The multimedia computer system chip 200 is one detailed embodiment of the multimedia computer system chip 102 illustrated in FIG. 1.

The multimedia computer system chip 200 illustrated in FIG. 2 includes a central processing unit (CPU) 202 and various coprocessors. The CPU 202 is a microprocessor, preferably a reduced instruction set computer (RISC) design such as MIPS R4000 produced by MIPS Technologies, Inc. of Mountain View, Calif. (a division of Silicon Graphics, Inc.). In this embodiment, the various coprocessors include a graphics geometry coprocessor 204, a MPEG coprocessor 206, and a graphics rendering coprocessor 208. The graphics geometry coprocessor 204 is provided to accelerate three-dimensional (3D) transformation of vertices, normal vectors, and lighting/shading calculations. Flexibility is provided by making the CPU 202 responsible for traversing a 3D graphic database. The graphics geometry coprocessor 204 is coupled to the CPU 202 through a coprocessor bus 210. The graphics rendering coprocessor 208 performs pixel level rendering operations of graphic objects. For example, the graphics rendering coprocessor 208 accelerate s shading, texturing, hidden surface removal and blending. The MPEG coprocessor 206 and the graphics rendering coprocessor 208 are coupled to the CPU 202 through an input/output (I/O) bus 212. The MPEG coprocessor 206 provides real-time decompression of MPEG video sequences. These MPEG computations are complicated, particularly those for MPEG-2. The CPU 202 is also coupled to a main CPU bus 214. The multimedia computer system chip 200 also includes a code ROM 216 that stores boot-up program code as well as a private key for decryption purposes discussed below.

A primary memory interface 218 couples to the main memory 104 through a first memory bus 220. The primary memory interface 218 includes an encrypter/decrypter 222. The encrypter/decrypter 222 operates to encrypt data being stored to the main memory 104 and to decrypt data being retrieved from the main memory 104. Also coupled to the main CPU bus 214 is an auxiliary memory interface 224. The auxiliary memory interface 224 couples to the main memory 104 through a second memory bus 226. Alternatively, the second memory bus 226 could couple to a different memory chip in the case in which the main memory 104 comprises several different memory chips and even different memory types segregated from one another. The auxiliary memory interface 224 includes an encrypter/decrypter 228. The encrypter/decrypter 228 operates to encrypt data being stored to the main memory 104 and to decrypt data being retrieved from the main memory 104.

The multimedia computer system chip 200 further includes a stream I/O interface 230 that couples to the I/O bus 212 and the main CPU bus 214 through a stream bus 234. In this embodiment, the stream I/O interface 230 is also coupled to the MPEG coprocessor 206. The stream I/O interface 230 includes a decrypter 232. The decrypter 232 operates to decrypt incoming data from a peripheral device 106 for use internal to the multimedia computer system chip 200. The decrypter 232 can be bypassed in cases in which the data being retrieved from the peripheral device 106 is forwarded via the stream bus 234 and the main CPU bus 214 to the main memory 104 through either the primary memory interface 218 or the auxiliary memory interface 224.

To provide audio output to the audio DAC /AMP 110 and the speakers 112, the multimedia computer system chip 200 includes an audio DAC interface 236. The audio DAC interface 236 is coupled to the MPEG coprocessor 206 which provides digitized audio sound data to the audio DAC interface 236. The MPEG coprocessor 206 preferably provides full MPEG-2 support. The MPEG coprocessor 206 is also coupled to a display controller 238. The display controller 238 operates to read digitized pictures from memory and then generate the appropriate pixel values for display of the picture. The processing by the display controller 238 includes horizontal and vertical filtering as well as color space conversions. The display controller 238 provides display control information to a video DAC PAL/NTSC encoder 240. The video DAC PAL/NTSC encoder 240 operates to drive the display device 108 in accordance with a digital waveform produced by the video DAC PAL/NTSC encoder 240. The video DAC/PAL NTSC encoder 240 generates synchronization information and produces digital video waveforms with PAL NTSC synchronization.

Furthermore, to enhance performance, the multimedia computer system chip 200 further includes a video bus 242 and a graphics bus 244. The video bus 242 provides a direct bus connection between the primary memory interface 218 and the MPEG coprocessor 206 as well as the display controller 238. The video bus 242 is particularly useful to provide the high bandwidth required for producing video output as well as for receiving video input and storing the video input directly to memory. The graphics bus 244 provides a direct bus connection between the primary memory interface 218 and the graphics rendering coprocessor 208. The graphics bus 244 allows the graphics rendering coprocessor 208 to access the main memory 104 via the primary memory interface 218 without assistance from the CPU 202 or the I/O bus 212 or the main CPU bus 214 associated with the CPU 202.

The encryption and decryption apparatus provided in the multimedia computer system chip 200 is useful to enhance the security for the computer program being executed or the data that it utilizes or produces. In particular, since all the external transmissions of the program code or data are in an encrypted form, unauthorized third parties are unable to copy the program code or data without knowing the private encryption key stored in the code ROM 216. However, given that the code ROM 216 is internal to the multimedia computer system chip 200 and not accessible by the outputs or pins of the multimedia computer system chip 200, third parties would not be able to obtain access to the computer code or data in a useable format without first having cracked the encryption algorithm.

When executing program code for a graphically based a computer program (such as a game related computer program), the CPU 202 will often interact with the graphics geometry coprocessor 204 and the graphics rendering coprocessor 208 to produce graphical images associated with the computer program being executed. However, in the case in which video is being output by the multimedia computer system chip 200, the CPU 202 interacts with the MPEG coprocessor 206 which provides the video functionality. Preferably, the CPU 202 issues instructions to these coprocessors. Once instructed, these coprocessors 204, 206 and 208 can operate autonomously for extended periods of time. Given the design of the multimedia computer system chip 200, the CPU 202, as a controller, can dynamically shift processing power to support different levels of combined performance in graphics, sound, video and interactivity at different instants in time. The available combined potential processing power is on the order of two (2) billion operations per second (2 Gops).

Figure 3:
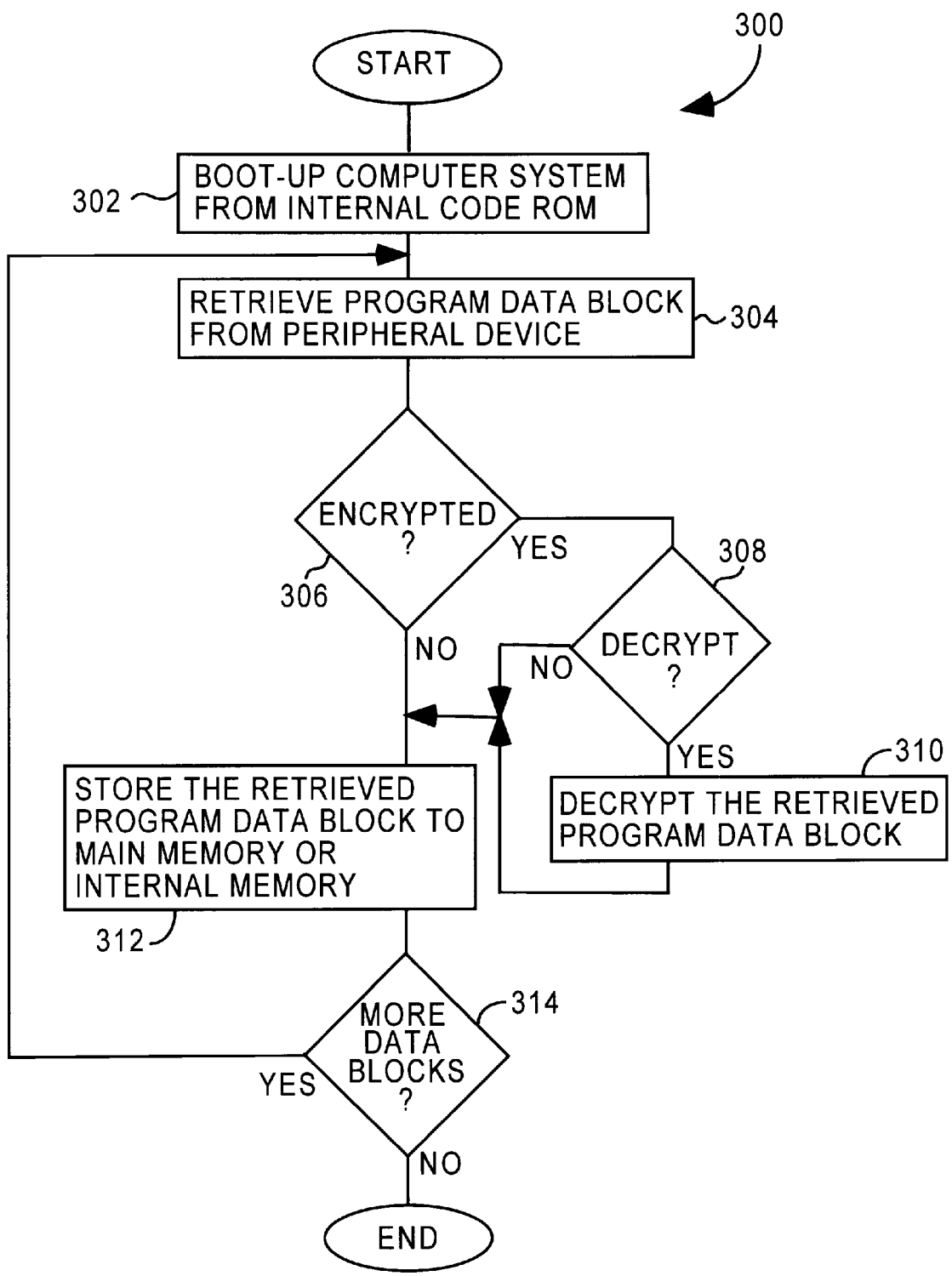
FIG. 3 is a flow diagram of a boot-up procedure according to an embodiment of the invention.

FIG. 3 is a flow diagram of a boot-up procedure 300 utilizing encryption according to an embodiment of the invention. The boot-up procedure 300 initially boots-up 302 the computer system 100 from the internal code ROM 216. More particularly, the computer system 100 boots-up 302 using computer code stored in the internal code ROM 216. Since the internal code ROM 216 is internal to the single chip computer system 102, 200, unauthorized third parties are severely hindered (largely prevented) from obtaining access to the data and code stored in the internal code ROM 216. Consequently, the computer system 100 is able to self-protect its sensitive computer code and data, such as computer code or data that is not to be copied or used without authorization.

Next, a program data block is retrieved 304 from the peripheral device 106. For example, program data block may include the program code, data or both program code or data. The program data block could be stored on a CD-ROM or hard drive and the retrieval of the program code or data could be through the stream I/O interface 230. A decision block 306 then determines whether the retrieved program data block is encrypted. Normally, for security reasons, the program code or data of the program data block being retrieved would be encrypted. However, in general, the program data block being retrieved can be encrypted or not encrypted, or some portion of the program code or data of the program data block can be encrypted while other portions are not encrypted. If the decision block 306 is determines that the retrieved program data block is encrypted, then a decision block 308 determines whether the decryption is requested 308. If decryption is requested, the retrieved program data block is decrypted 310. The decryption is preferably performed using a private encryption key that is securely stored in the internal code ROM 216 such that it is not accessible from external to the computer system chip 102, 200. A variety of different encrrryption algorithms can be utilized, though preferably the encryption is performed using a public key and decryption is performed using a private key. Thereafter, following block 306 when the retrieved program data block is not encrypted or following block 308 when the retrieved program data block is not to be decrypted or following block 310 when the retrieved program data block has been decrypted, the retrieved program data block is stored 312 to the main memory 104 or internal memory. The internal memory (not shown) is internal to the computer system chip 102, 200 and like the internal code ROM 216 is not accessible from external to the computer system chip 102, 200.

Next, a decision block 314 determines whether there are more data blocks to be retrieved from the peripheral device 106. If the decision block 314 determines that there are more data blocks to be retrieved from the peripheral device 106, then the boot-up procedure 300 returns to repeat block 304 and subsequent blocks. On the other hand, when the decision block 314 determines that all of the data blocks that should be retrieved from the peripheral device 106 have been retrieved, then the boot-up procedure 300 is complete and ends.

Normally, the retrieved program data block would be decrypted as it arrives at the multimedia computer system chip 102, 200 because it is going to be stored internal to the multimedia computer system chip 102, 200. The multimedia computer system chip 102, 200 is then able to utilize the retrieved program data block because it has been decrypted. However, in the case in which the retrieved program data block is to be forwarded to the external main memory 104 where it will reside until needed, then the retrieved program data block can remain encrypted and be forwarded to the external main memory 104. On the other hand, even though destined for the external main memory 104, the retrieved program data block could instead be decrypted when entering the multimedia computer system chip 102, 200 at the stream I/O interface 230 and then later encrypted by the memory interface 218, 224 on being stored to the external main memory 104.

Figure 4:
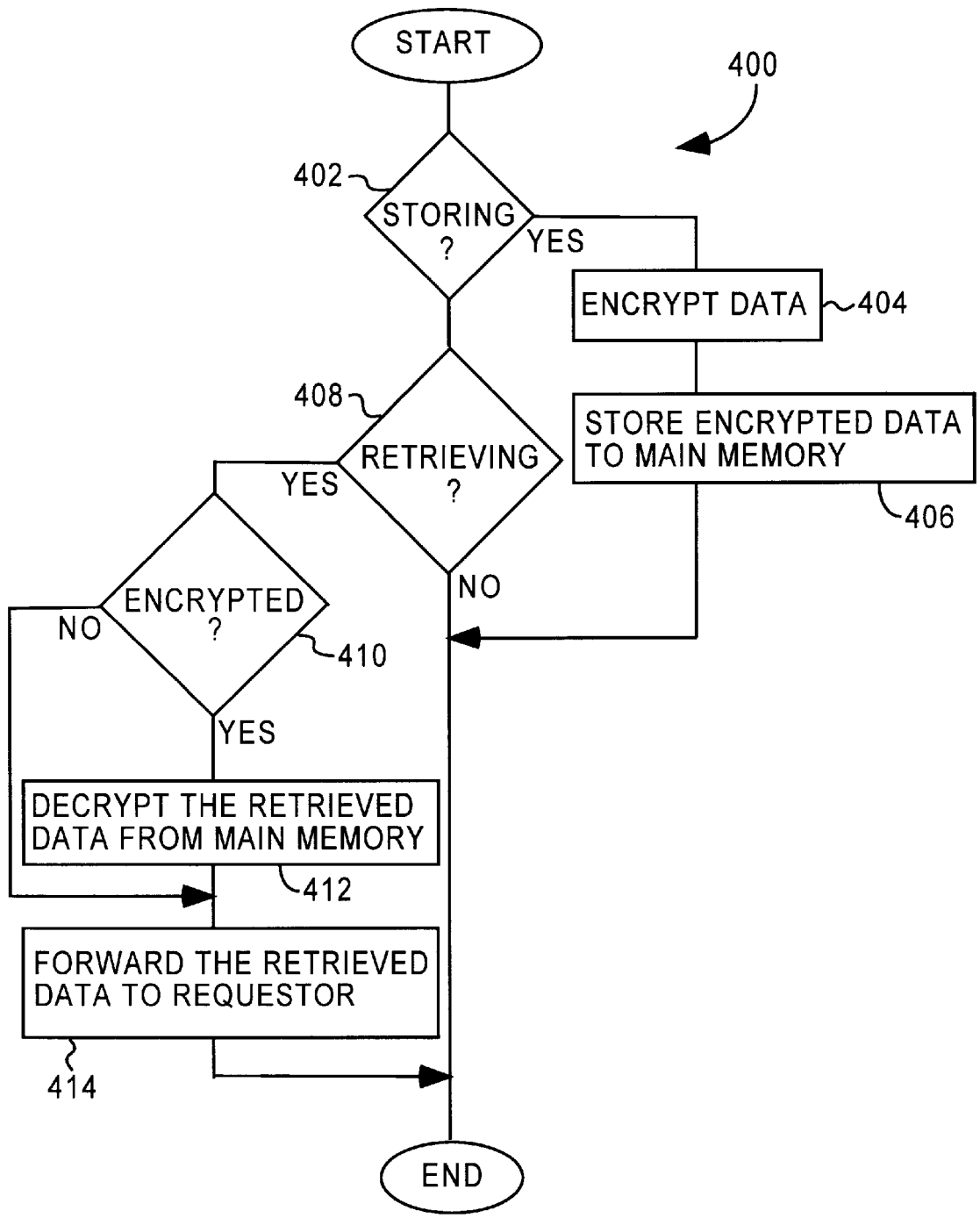
FIG. 4 is a flow diagram of a memory access procedure according to an embodiment of the invention.

The encryption or decryption process associated with the multimedia computer system chip 102, 200 is also applicable to memory accesses to the main memory 104 by the memory interfaces 218 and 224. FIG. 4 is a flow diagram of a memory access procedure 400 according to an embodiment of the invention.

The memory access procedure 400 begins with a decision block 402 that determines whether data is being stored to the external main memory 104. If data is being stored to the main memory 104, the data is encrypted 404 and then the encrypted data is stored 406 to the external main memory 104. In this case, the data is encrypted because it is leaving the multimedia computer system chip 200 and being stored to the external main memory 104 which is external to the multimedia computer system chip 200. Of course, if the data being stored is already encrypted the block may be bypassed. As noted above, a variety of different encryption algorithms can be utilized, though preferably the encryption is performed using a public key and decryption is performed using a private key.

On the other hand, when the decision block 402 determines that data is not being stored, a decision block 408 determines whether data is being retrieved from the external main memory 104. If the decision block 408 determines that data is being retrieved from the external main memory 104, then a decision block 410 determines whether the data being retrieved is encrypted. The decision block 410 is useful because in some implementations not all of the data stored in the external main memory 104 is encrypted, instead only data that is sensitive and desirable to keep out of the hands of unauthorized third parties is encrypted. In other implementations, all the data stored in the external main memory 104 is encrypted. When decision block 410 determines that the data being retrieved is encrypted, then the retrieved data from the external main memory 104 is decrypted 412. The decryption is preferably performed using a private encryption key that is securely stored in the internal code ROM 216 such that it is not accessible from external to the computer system chip 200. With respect to FIG. 2, the decryption is performed by the encrypter/decrypter 222 or the encrypter/decrypter 228 depending upon which of the primary memory interface 218 or the auxiliary memory interface 224 is retrieving the data. Alternatively, if the decision block 410 determines that the data being retrieved is not encrypted, then the block 412 is bypassed. In any case, following the block 412 or following the decision block 410 in the case in which decryption is not performed, the retrieved data is forwarded 414 to the requester. The requester is normally the CPU 202 or one of the coprocessors 204, 206 or 208 of the computer system chip 200.

Following blocks 406 and 414, as well as following the decision block 408 when data is not being retrieved, the memory access procedure 400 is complete and ends. The memory access procedure 400 is illustrative of the processing involved in encrypting and decrypting data being received or output from the multimedia computer system chip 102, 200. However, those skilled in the art will recognize that the storing and receiving subprocedures of the memory access procedure 400 would likely be implemented as separate procedures, and that the associated processing could be performed in hardware, software, or some combination of hardware and software.

The multimedia computer system chip 102, 200 according to the invention is highly integrated computer system in which MPEG (namely MPEG-2) and high-end graphics (such as three dimensional graphics) are provided on a single chip. The integration of this functionality onto a single chip allows latencies to the main memory 104 to be decreased. The integration also helps to optimize memory bandwidth because the operations of the various processors and coprocessors as well as their accesses to memory can be better scheduled for more parallel operations. In addition, all the processors and coprocessors may have access to other parts of the multimedia computer system chip 200 so as to obtain status information that is useful for scheduling operations.

One advantage of the invention is that the integration of the CPU 202 together with the various coprocessors 204, 206 and 208 eliminates the need for an external interface between the CPU and the various coprocessors that would be external chips conventionally. The number of pins that would be required on such a chip is over one-hundred (100) pins which is a substantial savings since the present invention eliminates the need for these pins. In one embodiment of the multimedia computer system chip 200, the address bus is 32 bits and the data bus is 64 bits. Hence, in such an embodiment, these 96 pins as well as some control signals and interrupt lines conventionally required for coprocessor interface lines are all alleviated by the invention. By providing the CPU and the various coprocessors on a single chip, these pins are no longer required.

Another advantage of the invention is the increased opportunities for memory sharing. The main memory 104 is able to be efficiently shared by the CPU 202 and the various coprocessors residing on the single chip computer system. In addition, the substantial random access memory (RAM) that a display controller conventionally includes can be largely eliminated in favor of using a portion of the main memory 104. In the multimedia computer system chip 200, the bandwidth provided to the main memory 104 is high enough to support this function, particularly when the multimedia computer system chip 200 includes a video bus 242 directly coupling the display controller 238 to the primary memory interface 218.

Still another advantage is that the single chip computer system offers increased security for program code and data so as to deter unauthorized access thereto. By encrypting sensitive program code and data external to the single chip computer system, unauthorized users are largely prevented from gaining access to the program code and data in a useable form. The private key needed to decrypt the encrypted program code and data is stored internal to the single chip computer system such that it is not accessible or discoverable by simply examining inputs and output of the single chip computer system. To obtain the private key would require the difficult and time consuming task of reverse-engineering the chip itself in an attempt to try to located the private key value encoded into the semiconductor structure.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A single chip computer system, comprising:
   a read-only memory (ROM), said ROM storing at least boot-up code to boot-up said single chip computer system;
   a plurality of special-purpose coprocessors for performing special processing tasks, said special purpose coprocessors comprise an MPEG coprocessor for producing video images, a graphics geometry coprocessor for performing geometric transformations on graphical objects to be displayed, and a graphics rendering coprocessor for receiving the transformed graphical objects from said graphics geometry coprocessor and for rendering the transformed graphical objects for display;
   a central processing unit (CPU) for performing general purpose processing tasks, the general purpose processing tasks include executing of program code;
   at least one inter-processor bus dedicated to transmitting data and control signals between said CPU and at least one of said coprocessors or between two or more of said coprocessors;
   a memory interface for interfacing said single chip computer system to an external common shared memory;
   a main CPU bus for transmitting data and control signals between said CPU and said memory interface, said main CPU bus being separate from said at least one inter-processor bus;
   a display controller for controlling a display device to display graphical images and video images;
   a graphics bus operatively connecting said graphics rendering coprocessor and said memory interface; and
   a video bus operatively connecting said memory interface to said MPEG coprocessor and said display controller.

2. A single chip computer system as recited in claim 1, wherein said at least one inter-processor bus comprises:
   an input/output (I/O) bus operatively connecting said CPU, said MPEG coprocessor and said graphics rendering coprocessor.

3. A single chip computer system as recited in claim 2, wherein said at least one inter-processor bus comprises:
   a coprocessor bus operatively connecting said CPU and said graphics geometry coprocessor.

4. A single chip computer system as recited in claim 3, wherein said single chip computer system further comprises:
   a stream interface for receiving data from a peripheral drive; and
   a stream bus for supplying the received data to at least one of said I/O bus and said main CPU bus.

5. A single chip computer system as recited in claim 1, wherein said computer system further comprises:
   an auxiliary memory interface for interfacing said single chip computer system to said external common shared memory, and
   wherein said main CPU bus transmits data and control signals between said CPU and at least one of said memory interface and said auxiliary memory interface.

6. A single chip computer system as recited in claim 5, wherein said external common shared memory comprises a first memory device and a second memory device, and
   wherein said memory interface accesses said first memory device and said auxiliary memory interface accesses said second memory device.

7. A single chip computer system as recited in claim 1, wherein said computer system further comprises:
   an audio digital-to-analog converter (DAC) interface for operatively connecting said MPEG coprocessor to external speakers; and
   a video DAC PAL/NTSC encoder, operatively connected between said display controller and an external display device, for supplying image display information to the external display device in a suitable analog form.

8. A single chip computer system, comprising:
   a read-only memory (ROM), said ROM storing at least boot-up code to boot-up said single chip computer system;
   a plurality of special-purpose coprocessors for performing special processing tasks, said coprocessors including a graphics geometry coprocessor optimized for performing geometric transformations on graphical objects to be displayed, a graphics rendering coprocessor for receiving the transformed graphical objects from said graphics geometry coprocessor and for rendering the transformed graphical objects for display, and an MPEG coprocessor optimized for producing video images;

a central processing unit (CPU) for performing general purpose processing tasks, the general purpose processing tasks include executing of program code;

at least one inter-processor bus for transmitting data and control signals between said CPU and at least one of said coprocessors or between two or more of said coprocessors, said at least one inter-processor bus includes at least an input-output (I/O) bus operatively connecting said CPU, said MPEG coprocessor and said graphics rendering coprocessor;

a memory interface said single chip computer system to an external common shared memory;

a main CPU bus for transmitting data and control signals between said CPU and said memory interface; and a stream interface for receiving data from a peripheral drive; and a stream bus for supplying the received data to at least one of said I/O bus and said main CPU bus.

9. A single chip computer system as recited in claim 8, wherein said single computer system further comprises:

a display controller for controlling a display device to display graphical images and video images.

10. A single chip computer system as recited in claim 8, wherein said at least one inter-processor bus comprises:

a coprocessor bus operatively connecting said CPU and said graphics geometry coprocessor.

11. A single chip computer system, comprising:

a read-only memory (ROM), said ROM storing at least boot-up code to boot-up said single chip computer system;

a plurality of special-purpose coprocessors for performing special processing tasks, said coprocessors including a graphics geometry coprocessor optimized for performing geometric transformations on graphical objects to be displayed, a graphics rendering coprocessor for receiving the transformed graphical objects from said graphics geometry coprocessor and for rendering the transformed graphical objects for display, and an MPEG coprocessor optimized for producing video images;

a central processing unit (CPU) for performing general purpose processing tasks, the general purpose processing tasks include executing of program code;

at least one inter-processor bus for transmitting data and control signals between said CPU and at least one of said coprocessors or between two or more of said coprocessors;

a memory interface for interfacing said single chip computer system to an external common shared memory;

a main CPU bus for transmitting data and control signals between said CPU and said memory interface;

a display controller for controlling a display device to display graphical images and video images;

a graphics bus operatively connecting said graphics rendering coprocessor and said memory interface; and a video bus operatively connecting said memory interface to said MPEG coprocessor and said display controller.

12. A single chip computer system as recited in claim 11, wherein said at least one inter-processor bus comprises:

an input/output (I/O) bus operatively connecting said CPU, said MPEG coprocessor and said graphics rendering coprocessor.

13. A single chip computer, system comprising:

a read-only memory (ROM), said ROM storing at least boot-up code to boot-up said single chip computer system;

a plurality of special-purpose coprocessors for performing special processing tasks, said coprocessors including a graphics geometry coprocessor optimized for performing geometric transformations on graphical objects to be displayed, and an MPEG coprocessor optimized for producing video images;

a central processing unit (CPU) for performing general purpose processing tasks, the general purpose processing tasks include executing of program code;

at least one inter-processor for transmitting data and control signals between said CPU and at least one of said coprocessors or between two or more of said coprocessors;

a memory interface for interfacing said single chip computer system to an external common shared memory;

a main CPU bus for transmitting data and control signals between said CPU and said memory interface;

a display controller for controlling a display device to display graphical images and video images;

an auxiliary memory interface for interfacing said single chip computer system to said external common shared memory, and wherein said main CPU bus transmits data and control signals between said CPU and at least one of said memory interface and said auxiliary memory interface.

14. A single chip computer system as recited in claim 13, wherein said external common shared memory comprises a first memory device and a second memory device, and wherein said memory interface accesses said first memory device and said auxiliary memory interface accesses said second memory device.

15. A single chip computer, comprising:

a read-only memory (ROM), said ROM storing at least boot-up code to boot-up said single chip computer system;

a plurality of special-purpose coprocessors for performing special processing tasks, said coprocessors including a graphics geometry coprocessor optimized for performing geometric transformation on graphical objects to be displayed, a graphics rendering coprocessor for receiving the transformed graphical objects from said graphics geometry coprocessor and for rendering the transformed graphical objects for display, and an MPEG coprocessor optimized for producing video images;

a central processing unit (CPU) for performing general purpose processing tasks, the general purpose processing tasks include executing of program images;

at least one inter-processor bus for transmitting data and control signals between said CPU and at least one of said coprocessors or between two or more of said coprocessors;

a memory interface for interfacing said single chip computer system to an external common shared memory;

a main CPU bus for transmitting data and control signals between said CPU and said memory interface;

a display controller for controlling a display device to display graphical images and video images;

an audio digital-to-analog converter (DAC) interface for operatively connecting said MPEG coprocessor to external speakers; and a video DAC PAL/NTSC encoder, operatively connected between said display controller and an external display device, for supplying image display information to the external display device in a suitable analog form.

\* \* \* \* \*

UNITED STATES PATENT AND TRADEMARK OFFICE
CERTIFICATE OF CORRECTION

PATENT NO.        : 5,977,997                          Page 1 of 1
APPLICATION NO.   : 08/812773
DATED             : November 2, 1999
INVENTOR(S)       : Leonardo Wainsencher It is certified that error appears in the above-identified patent and that said Letters Patent is hereby corrected as shown below:

Column 11, Line 11, from -- a memory interface said single chip computer system to --
        change to -- a memory interface for interfacing said single chip computer system to --

Column 11, Line 62, from -- 13. A single chip computer, system comprising: --
        change to -- 13. A single chip computer system, comprising: --

Column 12, Line 31, from -- 15. A single chip computer, comprising: --
        change to -- 15. A single chip computer system, comprising: --

Signed and Sealed this

Seventeenth Day of August, 2010

David J. Kappos
*Director of the United States Patent and Trademark Office*